United States Patent Office 3,397,857
Patented Aug. 20, 1968

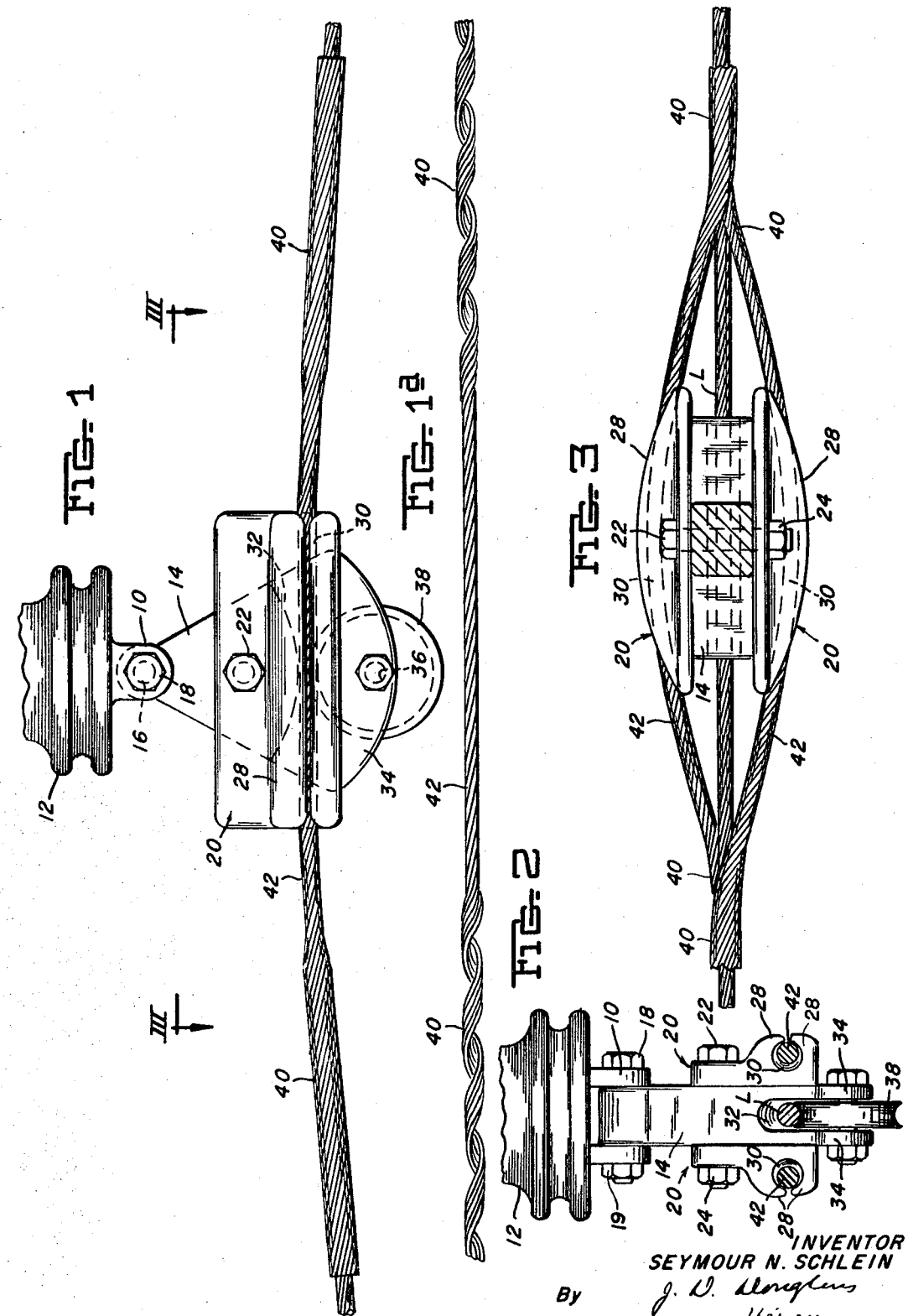

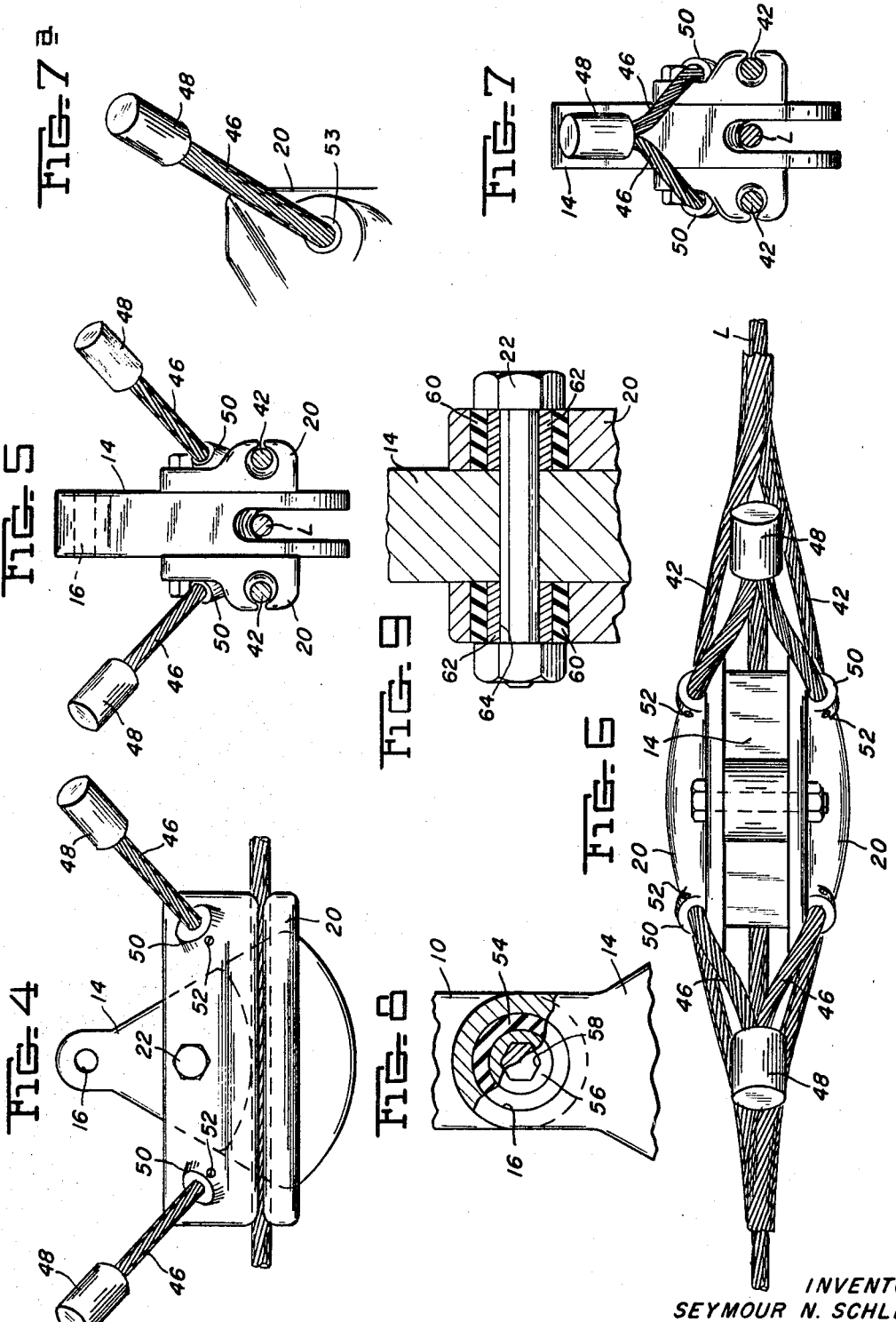

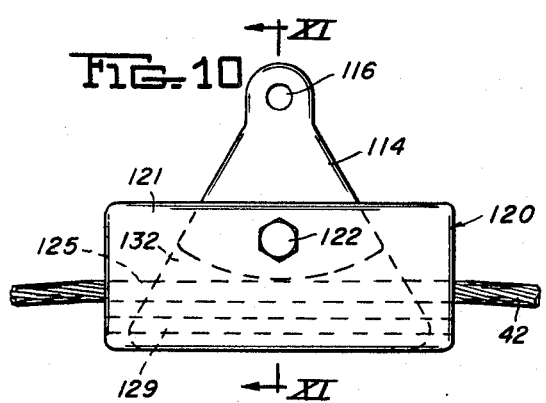
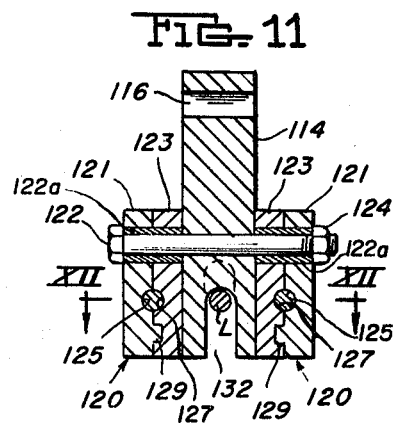
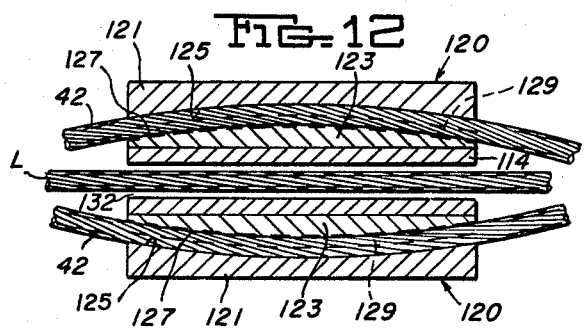
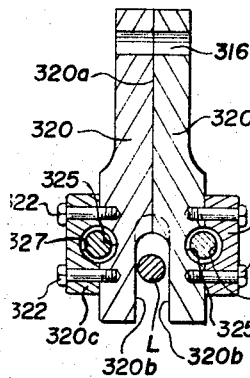
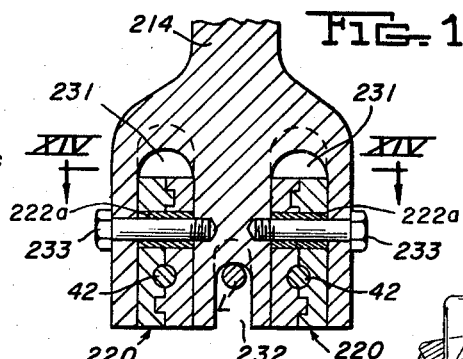
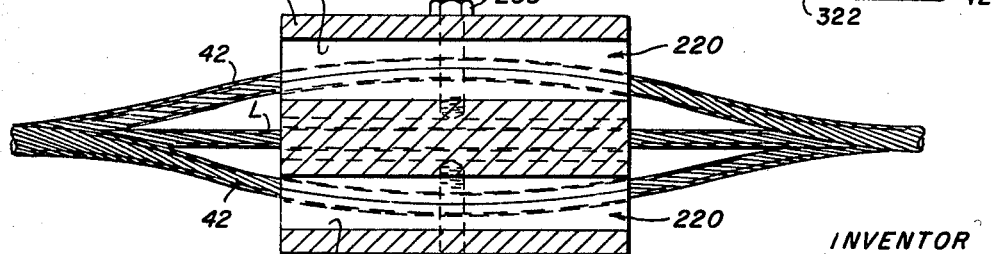

3,397,857
VIBRATION DAMPING LINE SUSPENSION
APPARATUS
Seymour N. Schlein, University Heights, Ohio, assignor to The Fanner Manufacturing Company, a Divison of Textron Inc., Cleveland, Ohio, a corporation of Rhode Island
Continuation-in-part of application Ser. No. 345,225, Feb. 17, 1964. This application July 11, 1966, Ser. No. 564,139
The portion of the term of the patent subsequent to July 12, 1983, has been disclaimed
26 Claims. (Cl. 248—63)

This is a continuation-in-part of application Ser. No. 345,225, filed Feb. 17, 1964, now Patent No. 3,260,487 entitled, "Line Suspension." This invention relates to improvements in line suspension devices and more particularly to suspension devices for suspending lines from the cross arm of a pole or tower which device will damp vibrations or oscillations of the line.

The above noted patent application discloses a line suspension system utilizing a hanger and a pair of preformed helically wound armor rods which are attached to the line by wrapping the ends of the armor rods around the lines and securing the central portions thereof to the hanger. The line thus secured by the armor rods is free of stress inducing clamping devices, and with such a system the line is supported in such a manner that there are no bending strains placed on it due to contact with the saddle or clamps. An additional advantage of such a system over the prior art clamps is that there is a large margin of safety because one or more of the parts may fail and the other parts still retain their holding power to prevent the line from falling, during which time the partial failure of the parts may be detected and the part replaced before a complete failure occurs.

The present invention constitutes an improved line suspension device which will provide all the advantages of the system of said application and in addition will provide excellent damping of vibrations and oscillations occurring in the line due to the Aeolian effect. To reduce and dampen these vibrations, the line support of this invention utilizes several effective vibration damping systems.

Still other advantages of the invention, and the invention itself, will become more apparent from the following description of several embodiments thereof which are illustrated in the accompanying drawings and form a part of this specification.

In the drawings:

FIG. 1 is a side elevational view of one embodiment of a line suspension device according to this invention suspending a line therefrom;

FIG. 1a is an elevational view of a line engaging element;

FIG. 2 is a sectional view of the device of FIG. 1 showing the line and line engaging elements in section;

FIG. 3 is a sectional view taken substantially along the plane designated by the line III—III of FIG. 1;

FIG. 4 is a side elevational view of a device similar to FIG. 1 in corporating inertia type damping devices;

FIG. 5 is an end elevational view of the device of FIG. 4;

FIG. 6 is a plan view of a device similar to FIG. 3, showing the incorporation of inertia type damping devices;

FIG. 7 is an end elevational view of the device of FIG. 6;

FIG. 7a is a detail view of another type of mounting of an inertia type damper;

FIG. 8 is a fragmentary view of another embodiment of the eye structure of a hanger;

FIG. 9 is a fragmentary view of another embodiment of the mounting of the arms;

FIG. 10 is a side elevational view of another embodiment of a damping device of this invention;

FIG. 11 is a sectional view taken substantially along the plane designated by the line XI—XI of FIG. 10;

FIG. 12 is a sectional view taken substantially along the plane designated by the line XII—XII of FIG. 11;

FIG. 13 is a sectional view similar to FIG. 11, of still another embodiment of a damping device according to this invention;

FIG. 14 is a sectional view taken substantially along the plane designated by the line XIV—XIV of FIG. 13;

FIG. 15 is a sectional view of still another embodiment of a damping device according to this invention; and FIG. 16 is a side elevational view of the device of FIG. 15.

Briefly, according to the present invention an improved line suspension device is provided which has pivotally mounted support members or arms. The arms are each provided with means which are positioned to engage and hold the center portion of a line engaging element. The line engaging elements each include helically wound armor rods usually with a hard twist central section. The arms are free to move pivotally in a vertical plane and preferably the arms have friction surfaces for the dissipation of energy as heat. The invention also contemplates inertia type dampers secured to the arms, and also torsion means to improve the damping properties of the device.

More specifically, and referring now to the drawings, and more particularly to FIGS. 1 through 3, one embodiment of an improved line suspension device according to this invention is shown. The device is shown being used in its typical environment attached to a clevis 10 at the bottom of a string of insulators 12.

The line suspension device includes a hanger member 14 having an eye 16 at its upper end which is pivotally secured to the clevis 10 by a bolt 18 and nut 19. A pair of support arms or members 20 are provided which are secured to the hanger member 14 by a bolt 22 which passes through both of the arms 20 and through the hanger 14. A nut 24 is threaded on the end of the bolt and can be tightened against the arms 20 to any degree of tightness. The arms 20 are thus pivotally mounted to the hanger 14 and are free to move pivotally in a vertical plane. The inner surfaces of each of the arms 20 frictionally engage the outer surfaces of the hanger 14. Each of the arms 20 is provided with a pair of longitudinally extending spaced flanges 28 which define therebetween grooves 30.

The hanger member 14 is provided with a slot defining a longitudinally extending line receiving passage 32 curving upwardly from the center of the hanger to both ends. The groove 32 bisects the hanger member and provides a pair of downwardly extending legs 34, the lower ends of which are provided with eyes 36. A sheave 38 is provided which can be detachably secured in eyes 36.

The line attaching means or engaging element, in the preferred form is shown in FIG. 1a, and includes a plurality of armor rods assembled and helically wound into partial lay end portions 40, with a hard twisted center portion 42. The description of the formation of this, as well as other line attaching means which also may be used in the present invention, is discussed fully in said Patent No. 3,260,487. It is to be understood that these attaching means may take various other forms and the element of FIG. 1a and the others described in said application are merely illustrative of the type of elements that can be used with this invention. For example, engaging elements having partial end portions with straight or untwisted central portions could be used.

To utilize the device, the hard twisted zone of one element is laid in the groove 30 of one arm 20 and the flanges 28 are bent over to firmly grip and secure the midportion 42 thereof. The hard twisted zone 42 of another element is placed in the groove 30 of the other arm 20 and the flanges are bent over in the same way. The line L is then raised into position into the passage 32 between the legs 34, the sheave 38 is then inserted, and the helical ends of each of the wire gripping elements are wrapped around the wire on opposite sides of the hanger member as shown in FIG. 1. If each of the ends 40 are initially a half-lay, the two together will form a full-lay around the line on both sides of the hanger as shown. However, the two ends 40 may be less than half-lay in which case the two together will be less than a full-lay. In some cases this may be desirable to increase the holding power of the elements. The sheave 38 supports the line L in place while the line is being secured by the wire gripping elements and it may either be left in the device permanently to provide a rest for the line after assembly is completed or it may be removed, allowing the line to hang free. In either case the support of the line is provided by the wire gripping elements and no clamping devices are secured to the line to cause an increase in stresses, and the line is maintained in the groove 32 free of clamping stresses at its apex. The nut and bolt 22 and 24 are then tightened sufficiently to provide the desired amount of frictional resistance between the surfaces of the arms 20 and the outer surfaces of the hanger 14. The amount of frictional resistance will depend upon the amount of damping desired due to this frictional action, as will be described presently.

The damping action of the device shown in FIGS. 1 through 3 will occur by two specific mechanisms. The first of these mechanisms is a phase interference which results from the pivotal mounting of the arms 20 with respect to the hanger 14. The oscillations in the line L on opposite sides of the device will almost invariably be out-of-phase with each other. These oscillations are transmitted from the line to the support elements which are connected to the arms 20. Since the arms 20 are pivotally mounted they will tend to move responsive to the oscillations of the line and the out-of-phase oscillations will each tend to cancel each other out to the extent that they are out-of-phase with each other. Hence the damping is proportional to the phase difference, and if oscillations on opposite sides of the hanger were precisely 180° out-of-phase and of the same amplitude they would absolutely cancel each other at the pivot arms.

The second mechanism of damping the oscillations is that of energy absorption by the frictional engagement of surfaces of the arms with surfaces of the hanger, and the outer surfaces of the hanger around its eye being in frictional sliding engagement with the surfaces of the clevis. The frictional engagement of these surfaces physically resists the occurring oscillations in the line, absorbing the energy, and dissipating it as heat. The amount of energy absorbed is dependent upon the force of friction to be overcome which, in turn, is dependent upon the size of the surfaces, the character of the surfaces and the tightness of the nut and bolt 22 and 24 and the tightness of the bolt and nut 18 and 19. Therefore, it is preferable to provide good frictional characteristics to the engaging surfaces of the arms and hanger and the hanger and clevis so that the maximum utilization of this frictional force absorption of energy can be made. Friction increasing facings such as are used for clutches or the like may be employed to increase friction and thereby increases the effective damping of the device. Likewise it may be desirable to snugly tighten the nut and bolt 22 and 24 and bolt and nut 18 and 19 so as to provide a maximum useable amount of frictional force. However, the nut and bolt should not be tightened so tight as to bind the arms 20 to the hanger member 14, or the hanger to the clevis thus preventing any movement and defeating the effect of the frictional movement of these two members. The tightness of the nut and bolt can quickly be determined by observing the line and hanger 14 and testing the action of the line in moving the arms 20 and the hanger 14 during installation. If the adjustment proves to be wrong, or the bolts loosen, adjustments can be made periodically to maintain the proper amount of frictional force.

Thus, when a line is supported utilizing a device of this invention, all of the benefits derived from the device described in Patent No. 3,260,487 are obtained and, in addition, an improved damping of oscillations is achieved without sacrificing any of the benefits derived.

In order to achieve even further damping, inertia type damping devices can be secured to the arms 20, as shown in FIGS. 4 through 7. In FIGS. 4 and 5 a device similar to that of FIG. 1 is shown having a pair of inertia type dampers secured to each of the arms 20. Each of the inertia type dampers includes a stiff cable 46 having at the end thereof a weight 48. The cables 46 are secured to the arms 20 in any convenient manner such as by placing them in apertures 50, as shown in FIG. 4, and securing them by means of a set screw 52. In the embodiment of FIGS. 6 and 7, the inertia type dampers each take the form of a single weight having a pair of cables, each of the cables being connected to one end of the arms on opposite sides of the hanger member 14 with the cables of the other weight being connected to the other ends of the arms 20, also on opposite sides of the hanger 14.

FIG. 7a shows a different type of mounting of the damper wherein the cable is secured to an externally threaded collar 53 which is screwed into the arm 20.

The weights as shown are solid cylinders, but hollow cylinders can also be employed. Also corona reducing shapes such as spheres can be used.

With the devices as shown in FIGS. 4 through 7, an additional damping action is provided by the inertia type dampers. This type of damping is well known in the art and these dampers used in conjunction with the two damping mechanisms of this device previously described provides an outstanding damping device, which will damp both large and small oscillations and provide an outstanding device for line support.

Additional damping can be achieved by torsion means which absorb energy and dissipate it as heat. Two such embodiments are shown in FIGS. 8 and 9. In FIG. 8 the eye 16 is provided with a tube of resilient material 54, such as rubber. A sleeve 56 passes through the rubber 54 and has a polygonal central bore 56. A bolt with a mating polygonal shank passes through the bore 56 and engages the clevis which also has a mating polygonal bore. This provides a torsion effect to damp oscillations.

Similarly, in FIG. 9 the openings in the arms 20 through which the bolt 22 passes are provided with a rubber or other resilient tube 60 having a central sleeve 62 with a polygonal bore 64. A bolt having a mating polygonal shank passes through the polygonal bore 64 and a similarly shaped polygonal bore in hanger 14. This will provide for a torsion damping of oscillations as the arms 20 move with respect to the hanger 14.

Referring now to FIGS. 10, 11, and 12, another embodiment of the damping device of this invention is shown. In this embodiment the hanger member 114 is similar to that of the device of FIGS. 1 through 3, but the arms 120 are modified and take the form of longitudinally split blocks. The opposite sections of these blocks 121 and 123 are provided with grooves 125 and 127 which form a through central bore when the sections of the blocks 121 and 123 are fitted together. In order to position the blocks exactly to align the grooves 125 and 127, a tongue and notch construction 129 is provided for locating the blocks. A bolt 122 extends through both of the arms 120 and through the hanger member 114 and has threaded on the end thereof a nut 124 which will adjust the frictional resistance of the arms against the hanger 114, as in embodiment of FIG. 1. A bearing 122a is provided in each of the arms surrounding the bolt 122 to reduce wear thereon during operation of the device. Although these bearings are desirable, they are not essential.

This embodiment is readily adapted to be assembled completely in the field. To assemble the device, each of the sections 121 and 123 of the arms 120 are interlocked around the central portion 42 of a support element and the arms are then secured to the hanger member 114 by the nut and bolt 122 and 124. The ends of the support element are then wrapped around the line in the same manner as previously described. In this embodiment also the arms may be provided with inertia type dampers for additional damping action and a support sheave may also be incorporated. Also torsion type damping may be incorporated.

Referring now to FIGS. 13 and 14, still another embodiment of this invention is shown. In this embodiment the hanger member 214 is provided with a pair of longitudinally extending channels 231 on opposite side of and parallel to line receiving passage 232. The channels 231 curve upwardly from their centers to their opposite ends similar to the curvature of the passage 232. Support members or arms 220, similar to those shown in the embodiment of FIGS. 10 through 12, are disposed in the channels 231 and each is secured therein by a bolt 233 passing through bearings 222a, in the arms 220, and into the central portion of the hanger member 214. In this embodiment each of the support members 220 has two surfaces in contact with the surface of the hanger member 214, thus doubling the frictional resistance for any given level of torque of the bolts 233. This will increase the frictional damping without increasing the torque on the bolts. Also, in this embodiment the frictional resistance of each of the support arms 220 can be adjusted separately since each is secured by a separate bolt. However, it is to be understood that a single bolt could be used, passing through both support arms 220 and completely through the hanger member 114 and secured with a nut similar to the previously described embodiments, thereby permitting a single adjustment of the frictional resistance, resulting from the torque of the bolt. It is also to be understood that in the previously described embodiments, separate bolts could be used to secure each arm to the hanger member in a manner similar to that of FIGS. 13 and 14, so that in those embodiments the frictional resistance of each arm could be adjusted separately. Also, in the embodiment of FIGS. 10 through 14 inertia type damping devices similar to those of FIGS. 4 through 7a, could also be connected to the arms to provide additional inertia damping, and torsion type damping sleeves could also be provided.

Referring now to FIGS. 15 and 16, still another embodiment of this invention is shown wherein no hanger is utilized. A pair of support members 320 are mounted directly on the clevis for pivotal movement by bolt and nut (not shown). The bolt passes through eyes 316 at the top of the support members and through the clevis (not shown). The support members 320 are each provided with upper engaging friction surfaces 320a and lower spaced surfaces 320b. The lower spaced surfaces 320b define therebetween a line receiving groove of the shape previously described. Each of the support members 320 has a longitudinally extending groove 325 which together with a mating groove 327 formed in cover plate 320c defines a bore for receiving the central portion of the wire gripping elements. The cover plates 320c are bolted to their respective support member by a pair of bolts 322 passing through the cover plates and threaded into the support member 320. In this embodiment the support members are free to pivot independently directly on the clevis mounting.

As can be seen in FIG. 16, the line engaging bores defined by the grooves 325 and 327 curve downwardly in the vertical plane toward the opposite ends from the centers of the support members. This configuration may be desirable in some cases to reduce stress on the line engaging elements where the elements enter the support arms. This stress is due to curvature of the elements caused by their own weight and the weight of the supported line. This is particularly beneficial in this embodiment since a sheave cannot be allowed to remain between the support arms because of their relative motion; however, this curved configuration can be used in any of the other embodiments.

It is to be understood that in this embodiment inertia type dampers could be utilized as previously described and also the previously described resilient mounting at the clevis could be incorporated.

Although several embodiments of this invention have been shown, it is believed that the invention essentially comprises a device for the mounting of a line which will maintain the line free of damping stresses at its apex, and will engage the line with arm members pivoted to absorb the energy of oscillation in the line. The energy absorption takes place through various combinations of phase cancellation, dissipation as heat through torsion means, and as work in inertia type dampers. These various modes can be combined in such a way in the device to give excellent oscillation damping without the detrimental effects of clamping the wire at its apex.

Having thus described my invention in several embodiments thereof, I am aware that numerous and extensive departures may be made therefrom without departing from the spirit or scope of the invention as defined by the appended claims.

I claim:

1. A line suspension device comprising, a pair of support members, each of said support members being split block means together defining a central bore, means to suspend said support members from a support and pivotally mount them for pivotal movement in a vertical plane, each of said support members holding a line engaging element, each of said line engaging elements including at least one flexible extension portion extending from said support member and a gripped portion disposed within said central bore, said extension portions including means to engage a line.

2. The device of claim 1 wherein said support members are mounted on a central hanger member.

3. The device of claim 2 further characterized by means for pivotally mounting said support members on said central hanger member.

4. The device of claim 3 wherein said means for providing a pivotal mounting of the support members on said hanger member includes bolt means passing through both said hanger member and said support members.

5. The device of claim 3 wherein said means for pivotally mounting said support members includes bearing means carried by said support members.

6. A line suspension device comprising, a pair of support members, means to suspend said support members from a support and pivotally mount them for pivotal movement in a vertical plane, said support members including mutually engaging surfaces to dissipate energy as heat, each of said support members including gripping means holding a line engaging element, each of said elements including at least one flexible extension portion extending therefrom, each of said flexible extension portions including means to engage a line.

7. The device of claim 6 wherein said support members include means defining a line receiving groove therebetween.

8. The device of claim 6 wherein said gripping means holding the line engaging elements includes means for detachably securing said gripping elements.

9. The device of claim 8 wherein said means to detachably secure said elements includes cover plate means having a through central opening in which said gripping elements reside.

10. A line suspension device comprising, a hanger member, said hanger member having a slot extending upwardly from the bottom thereof defining a line receiving passage of sufficient height and width to accommodate the line to be supported and maintain the line free of clamping forces at its apex, a pair of channels disposed on opposite sides of said line receiving passage, and line support members being disposed in each of said channels, said support members including gripping means holding a line engaging element, each of said elements including at least one flexible extension portion extending therefrom, each of said flexible extension portions including means to engage a line.

11. The device of claim 10 wherein said support members include split block means.

12. The device of claim 10 wherein each of said support members is mounted on separate pivot means in its respective channel.

13. The device of claim 10 wherein said means for pivotally mounting said support members includes bearing means carried by said support members.

14. A line suspension device comprising, a pair of support members, means to suspend said support members from a support and pivotally mount them for pivotal movement in a vertical plane, each of said support members including gripping means holding a line engaging element, each of said elements including at least one flexible extension portion extending therefrom, each of said flexible extension portions including means to engage a line.

15. The device of claim 14, wherein said means holding the line-engaging elements includes grooves to seat said line-engaging elements and means disposed to at least partially close the grooves when the line-engaging elements are seated therein.

16. The device of claim 14, wherein said means to suspend and mount said support members includes a hanger member, and said support members are pivotally mounted on said hanger member.

17. The device of claim 16, further characterized by said hanger member and said support members having frictionally engaging surfaces to dissipate energy as heat.

18. The device of claim 16, wherein said hanger member is provided with a slot extending upwardly from the bottom defining a line receiving passage of sufficient height and width to accommodate the line being supported and maintain the line free of clamping forces at its apex.

19. The device of claim 16, wherein bolt means mount said support members.

20. The combination of claim 19, wherein separate bolts mount each support member.

21. The combination of claim 19, wherein a single bolt mounts each of said support members.

22. The device of claim 14, further characterized by at least one inertia type vibration damper carried by at least one of said support members.

23. The device of claim 22, further characterized by a plurality of inertia type dampers symmetrically arranged.

24. The device of claim 14, further characterized by torsion means disposed to absorb oscillating energy as torsional movement.

25. The device of claim 16, wherein torsion means are interposed between the support member and hanger member.

26. The device of claim 22, wherein torsion means are disposed to absorb oscillating energy between the hanger member and the support mounting.

References Cited

UNITED STATES PATENTS

| | | | |
|---|---|---|---|
| 3,260,487 | 7/1966 | Schlein | 248—63 |
| 471,096 | 3/1892 | Briggs | 248—63 X |
| 1,065,866 | 6/1913 | Fraley | 248—63 X |
| 2,086,150 | 7/1937 | Austin | 248—63 |
| 2,149,875 | 3/1939 | Talbott | 248—63 |
| 2,731,509 | 1/1956 | Becker | 174—42 |
| 2,783,297 | 2/1957 | Badeau | 248—63 |
| 3,113,173 | 12/1963 | Horovitz | 174—40 |
| 3,163,706 | 12/1964 | Peterson | 174—42 |
| 3,219,298 | 11/1965 | Ruhlman | 248—63 |
| 3,260,487 | 7/1966 | Schlein | 248—63 |

FOREIGN PATENTS 488,920  12/1952  Canada.

ROY D. FRAZIER, *Primary Examiner.*

R. P. SEITTER, *Assistant Examiner.*

UNITED STATES PATENT OFFICE
CERTIFICATE OF CORRECTION

Patent No. 3,397,857                                         August 20, 1968

Seymour N. Schlein

It is certified that error appears in the above identified patent and that said Letters Patent are hereby corrected as shown below:

Column 5, line 16, "side" should read -- sides --. Column 6, line 14, "damping" should read -- clamping --.

Signed and sealed this 10th day of February 1970.

(SEAL)
Attest:

Edward M. Fletcher, Jr.                      WILLIAM E. SCHUYLER, JR.
Attesting Officer                                     Commissioner of Patents